United States Patent [19]

Tsunekawa

[11] Patent Number: 4,523,101
[45] Date of Patent: Jun. 11, 1985

[54] IMAGE SCANNING SYSTEM WITH SIGNAL INTEGRATION TIME CONTROL

[75] Inventor: Tokuichi Tsunekawa, Yokohama, Japan

[73] Assignee: Canon Kabushiki Kaisha, Tokyo, Japan

[21] Appl. No.: 398,810

[22] Filed: Jul. 16, 1982

[30] Foreign Application Priority Data

Jul. 23, 1981 [JP] Japan ............................ 56-115484

[51] Int. Cl.³ ..................... G03B 3/10; H01J 40/14
[52] U.S. Cl. ..................... 250/578; 250/201; 354/402
[58] Field of Search ............ 250/201, 204, 211 J, 250/578; 354/402, 403, 406, 407, 409; 356/1, 4

[56] References Cited

U.S. PATENT DOCUMENTS

| | | | |
|---|---|---|---|
| 3,944,816 | 3/1976 | Harada | 250/211 J |
| 4,004,852 | 1/1977 | Pentecost . | |
| 4,180,309 | 12/1979 | Miyata et al. | 354/409 X |
| 4,283,137 | 8/1981 | Tsunekawa et al. . | |
| 4,305,657 | 12/1981 | Masunaga et al. . | |
| 4,329,033 | 5/1982 | Masunaga et al. . | |
| 4,411,504 | 10/1983 | Kinoshita et al. . | |
| 4,411,505 | 10/1983 | Sakai et al. | 354/402 |
| 4,437,743 | 3/1984 | Sakai et al. . | |
| 4,459,002 | 7/1984 | Sakai et al. . | |

*Primary Examiner*—Edward P. Westin
*Attorney, Agent, or Firm*—Fitzpatrick, Cella, Harper & Scinto

[57] ABSTRACT

Disclosed is an image scanning system including signal integration type image sensor, measuring device for measuring a light substantially equivalent to a light incident on the sensor, and a controller for controlling the signal integration time of the sensor on the basis of the output of the sensor and the output of the measuring device, the controller determining an initial signal integration time on the basis of the output of the measuring device and thereafter stepwise controlling the signal integration time on the basis of the output of the sensor with the initial integration time as the starting point.

23 Claims, 7 Drawing Figures

IMAGE SCANNING SYSTEM WITH SIGNAL INTEGRATION TIME CONTROL

BACKGROUND OF THE INVENTION

1. Field of the Invention

This invention relates to an image scanning system, and more particularly to improvements in the control of the signal integration time of image sensing means in an image scanning system using signal integration type image sensing means.

2. Description of the Prior Art

In recent years, a one-dimensional or two-dimensional signal integration type image sensing means such as a charge-coupled device (CCD) has become used in various fields. Such an image sensing means produces an output linearly proportional to the intensity of incident light and therefore its dynamic range is narrow. To cause the image sensing means to respond to a variation in the intensity of a wide range of incident light, a method has been proposed in which an upper limit reference level determined by the saturation level of the output of the sensing means and a lower limit reference level determined with noise such as dark current taken into account are preset, the output level of the sensing means relative to these reference levels is determined by level determination means and the signal integration time of the sensing means is stepwise changed by integration time control means so that the output level of the sensing means is within a predetermined range of levels, thereby enlarging the dynamic range.

Heretofore, design has been made such that the controllable longest integration time or the controllable shortest integration time or the medium integration time is preselected as an initial integration time set by the integration time control means. However, if this has been done, for example, in a system wherein the controllable shortest integration time is set as the initial integration time, where the intensity of the light incident on the sensing means is low, a considerable time has been required until an output of appropriate level is obtained from the sensing means by successively changing the integration time to prolong it by the cooperation of level determination means and integration time control means. Conversely, in a system wherein the controllable longest integration time is set as the initial integration time, a similar demerit has occurred where the intensity of the incident light is high. On the other hand, in a system wherein a medium suitable integration time is set as the initial integration time, such inconvenience is alleviated to some extent, but where a variation in intensity of light over a very wide range is the object, such system is still insufficient and a similar demerit has occurred when the intensity of the incident light has been very high or very low.

SUMMARY OF THE INVENTION

The present invention has been made in view of such inconveniences peculiar to the prior art and has as its primary object the provision of a novel integration time control method which, as a method of controlling the signal integration time of signal integration type image sensing means in an image scanning system using such sensing means, can clear off the inconveniences peculiar to the prior art regarding the control of the signal integration time of the sensing means.

It is another object of the present invention to provide improvements in an image scanning system using signal integration type image sensing means and adapted to stepwise control the signal integration time of the sensing means (i.e., the amount of the electrical signal to be produced and stored for each image scanning) on the basis of the output level thereof, whereby the time required for the setting of an integration time corresponding to the intensity of incident light can be greatly shortened and accordingly, for a certain intensity of incident light, an output of appropriate level can be obtained from the sensing means in a very short time.

To achieve such objects, according to the present invention, there is provided a radiation sensing system or an image scanning system having the following characteristic construction. The system includes: signal integration type radiation sensing means producing an electrical output capable of indicating the distribution pattern of incident radiation; means for measuring radiation substantially equivalent to the radiation incident on the sensing means and producing an electrical output capable of indicating the intensity thereof; and means for controlling the signal integration time of the sensing means on the basis of the output of the measuring means and the output of the sensing means.

In a preferred embodiment of the present invention, the integration time control means is designed to determine the initial integration time on the basis of the output of the measuring means, and thereafter stepwise control the integration time on the basis of the output of the sensing means with the initial integration time as the starting point.

Also, in one embodiment, the integration time control means is designed to use the peak level of the output of the sensing means as the basis of the determination as disclosed, for example, in U.S. Pat. Nos. 4,305,657 entitled "Range Finding Device", 4,283,137 entitled "Image Scanning System" and 4,329,033 entitled "Distance Detecting Device and Focus Control System Utilizing the Same" all of which were assigned to the same assignee of the subject application, in controlling the integration time among a plurality of preset different integration times on the basis of the output of the sensing means, but may also use the average level of the output as the basis of the determination or, as disclosed, for example, in U.S. Pat. No. 4,004,852, may use as the basis of the determination data obtained by quantizing the output of the sensing means.

Thus, according to the present invention, the intended purposes are completely achieved and there is provided a radiation sensing system or an image scanning system which is very excellent in responsiveness, that is, which can obtain the output of proper level pf the sensing means in a short time.

Other objects and features of the present invention will become apparent from the following detailed description of an embodiment thereof taken in conjunction with the accompanying drawings.

DESCRIPTION OF THE PREFERRED EMBODIMENT

Figure 1:
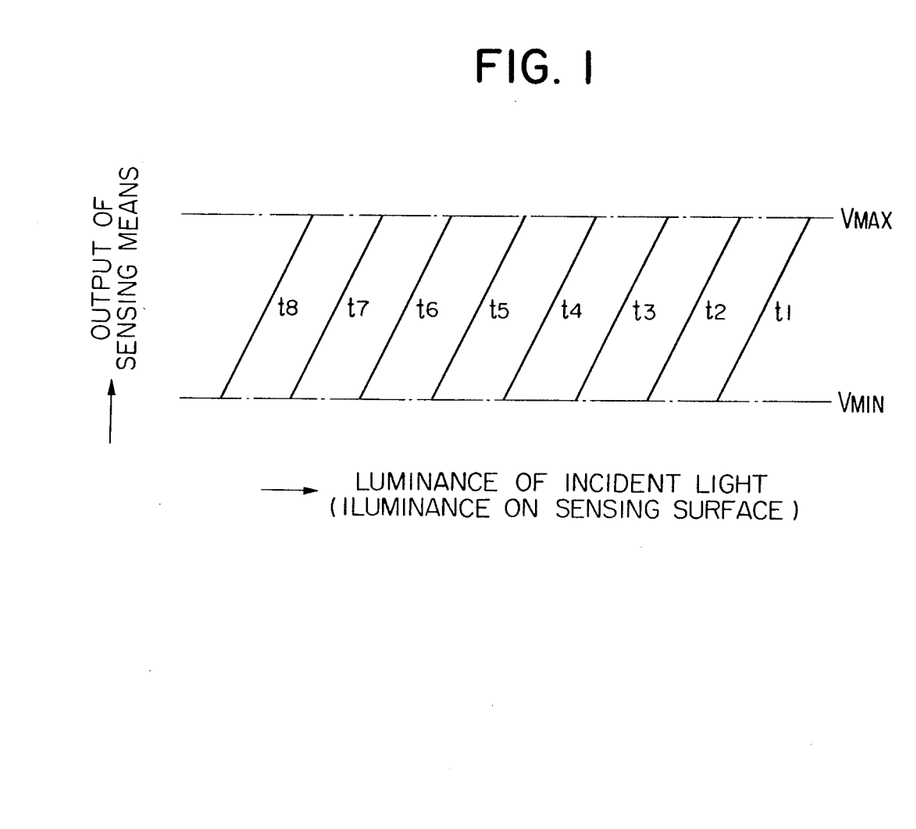
FIG. 1 is a model view for illustrating a method of controlling the signal integration time of signal integration type image sensing means which is the base of the present invention.

Reference is first had to FIG. 1 to describe the method of controlling the signal integration time of image sensing means which is the basis of the present invention. In FIG. 1, $V_{MAX}$ and $V_{MIN}$ are upper and lower limit reference levels between which the sensing means operates linearly. This figure shows the manner in which the accumulating time is changed between $t_1$ and $t_8$ so that the output level of the sensing means lies between the upper limit and lower limit reference levels.

Figure 2:
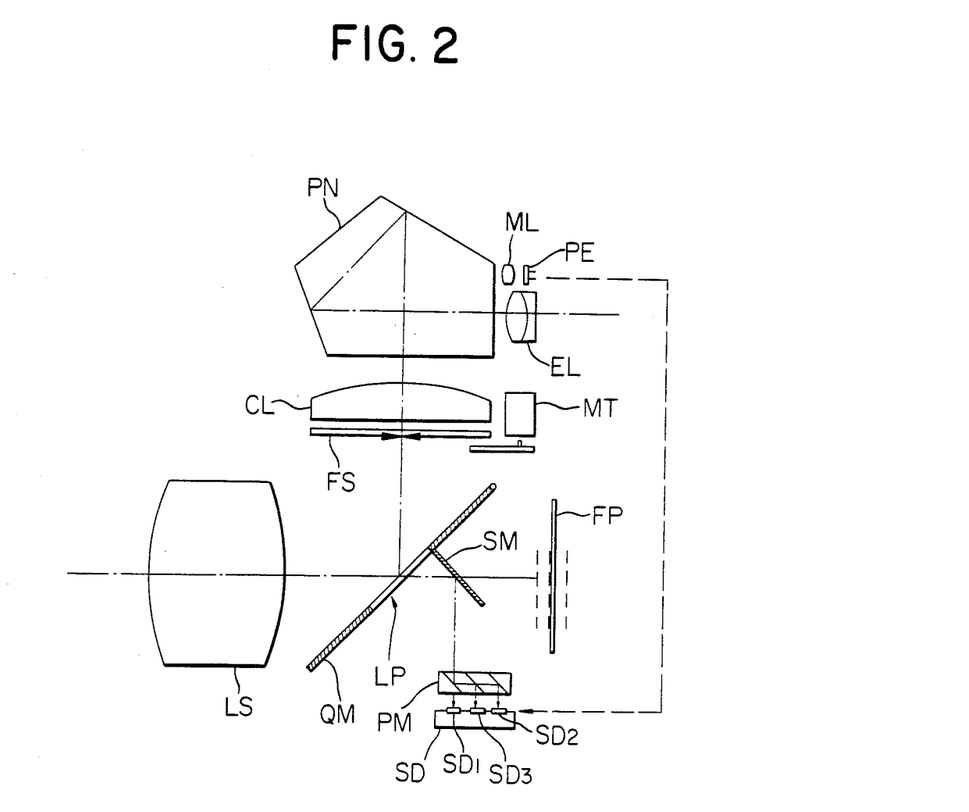
FIG. 2 is a model view showing an embodiment in which the image scanning system according to the present invention is applied to the focus detecting device of a single lens reflex camera.

Reference is now had to FIG. 2 and so on to describe an embodiment in which the image scanning system according to the present invention is applied to the focus detecting device of a single lens reflex camera. In FIG. 2, LS designates a picture-taking lens, FP denotes a film, QM designates a quick return mirror having a light-transmitting portion LP in the center thereof, and SM denotes an auxiliary mirror for downwardly reflecting the transmitted light from the light-transmitting portion LP of the mirror QM. The light beam reflected by the auxiliary mirror SM enters a prism PM, where it is divided into three light beams which respectively enter the three image scanning sections $SD_1$, $SD_2$ and $SD_3$ of the image sensing means SD. These three image scanning sections $SD_3$, $SD_1$ and $SD_2$ are adapted to receive the incident lights respectively at a position optically equivalent to the surface the film FP, a position slightly forward of the equivalent position and a position slightly rearward of the equivalent position due to the action of the prism PM. Each of the image scanning sections $SD_1$, $SD_2$ and $SD_3$ has a one-dimensional array of a plurality of signal integration type light-receiving elements as will later be described. FS designates a focusing screen, CL denotes a condenser lens, PN designates a penta prism, EL denotes an eyepiece lens, and ML designates a metering condenser lens which condenses light on a metering photoelectric conversion element PE. MT designates a display meter. As conceptionally shown in broken line in FIG. 2, the initial setting of the signal integration time of the image sensing means SD may be effected by the output of the metering photoelectric conversion element PE.

Figure 3:
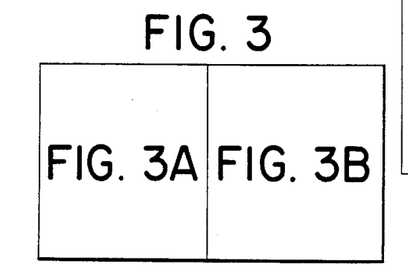
FIG. 3 is a circuit diagram showing the construction of the electric circuitry of the camera shown in FIG. 2, displayed in halves in FIG. 3A and FIG. 3B.
Figure 3A:
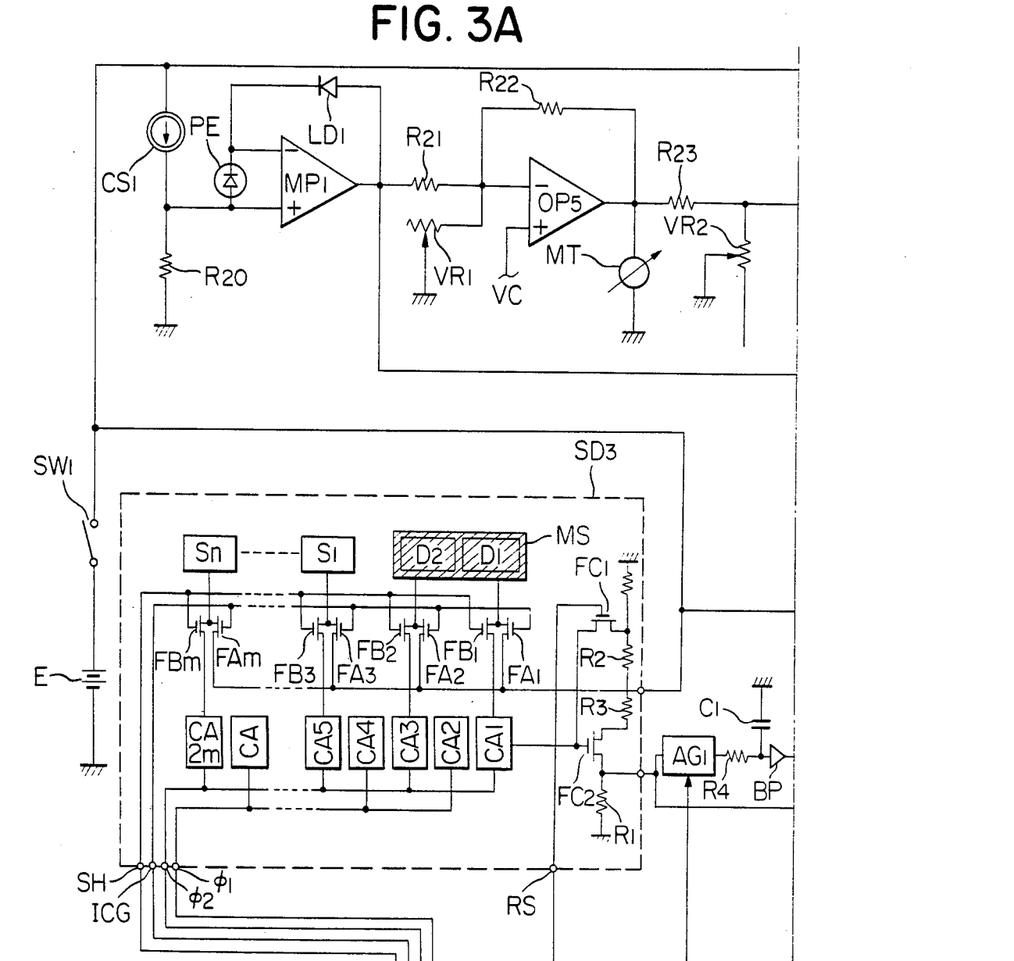
Figure 3B:
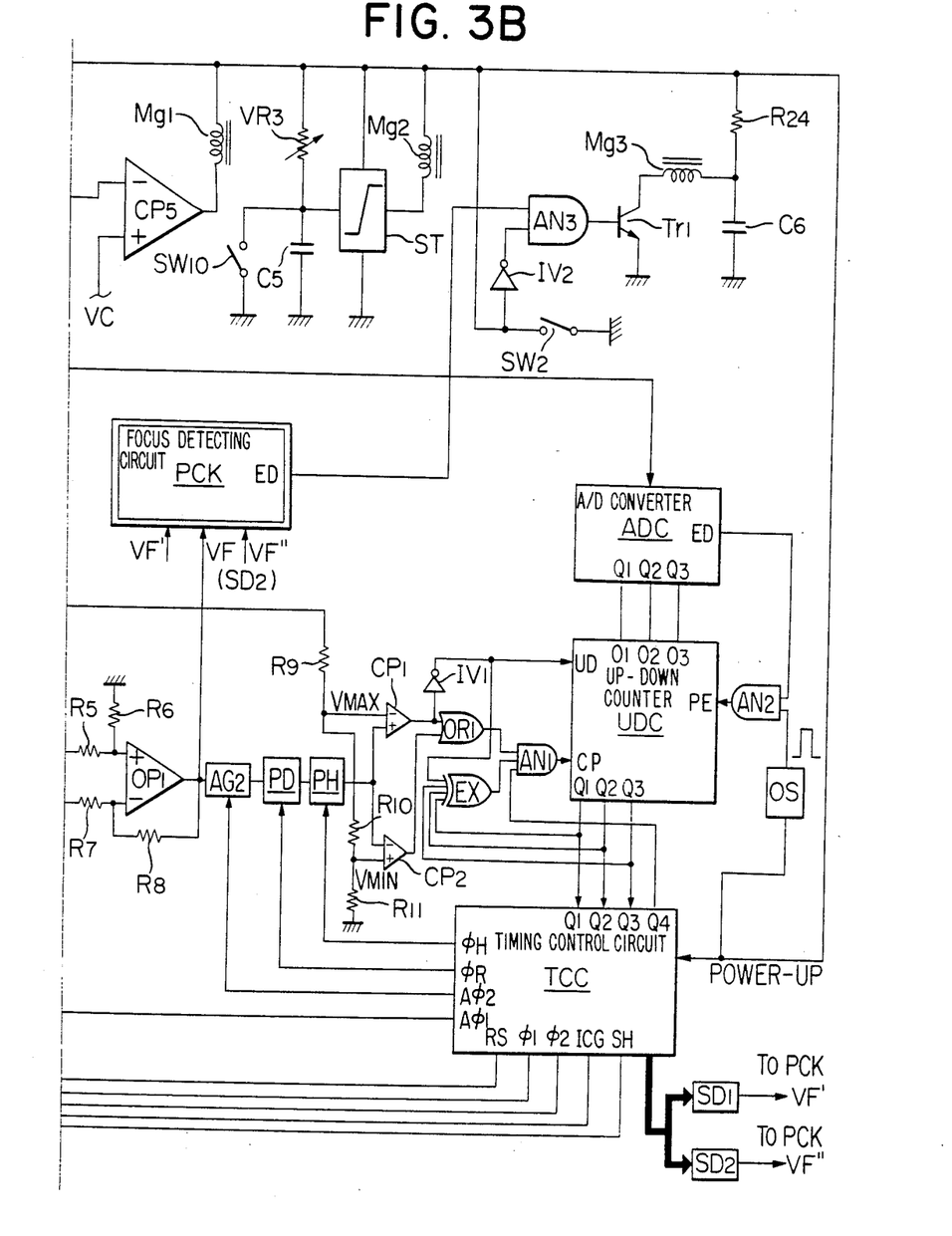

Referring to FIG. 3, $SD_3$ is the middle image scanning section of the image sensing means SD disposed so as to receive light at a position optically equivalent to the surface of the film FP and, in the present embodiment, the signal integration time of the image sensing means SD is controlled on the basis of the output of the image scanning section $SD_3$. $S_1$-$S_n$ designate light receiving elements (arranged one-dimensionally) included in the image scanning section $SD_3$, and $D_1$ and $D_2$ denote dummy elements masked, for example, by a mask MS(which can be formed by evaporation of Al) for dark current detection. $FA_1$, $FA_2$, ..., $FA_m$ ($m=n+2$) designate integration clear gates responsive to the high of an integration clear signal ICG to clear the charges stored in the light-receiving elements $S_1$-$S_n$ and dummy elements $D_1$, $D_2$. $FB_1$, $FB_2$, ..., $FB_m$ denote charge shift gates responsive to the high of a shift pulse SH to shift to charge transfer analog shift registers $CA_1$--$CA_{2m}$ the charges stored in the light-receiving elements $S_1$-$S_n$ corresponding to the integrated amount of the light incident thereon and the charges corresponding to the dark currents stored in the dummy elements $D_1$ and $D_2$. The analog shift registers $CA_1$-$CA_{2m}$ are of the two-phase driven type operated by clock pulses $\emptyset_1$ and $\emptyset_2$, and the transferred charges thereof are put out as voltage information at the last stage through a charge-voltage converting circuit comprising resistors $R_1$, $R_2$, $R_3$ and FET $FC_1$, $FC_2$.

$AG_1$ designates an analog gate for taking out only the signals obtained by the dummy elements $D_1$ and $D_2$, of the output of the image scanning section $SD_3$, and a holding capacitor $C_1$, a resistor $R_4$ and a buffer amplifier BP subsequent to the analog gate $AG_1$ together constitute a dark current signal holding circuit. The resistor $R_4$ is a resistor for forming a low-pass filter together with the capacitor $C_1$, and is not always necessary. Resistors $R_5$, $R_6$, $R_7$, $R_8$ and an operational amplifier $OP_1$ together constitute a differential amplifier circuit as a dark current compensating differential circuit, and this circuit puts out a dark-current-compensated true scanning output VF by subtracting the dark current signal components obtained by the dummy elements $D_1$ and $D_2$ which are held by the dark current signal holding circuit from the scanning output including the dark current components obtained by the light-receiving elements $S_1$-$S_n$.

Figure 4:
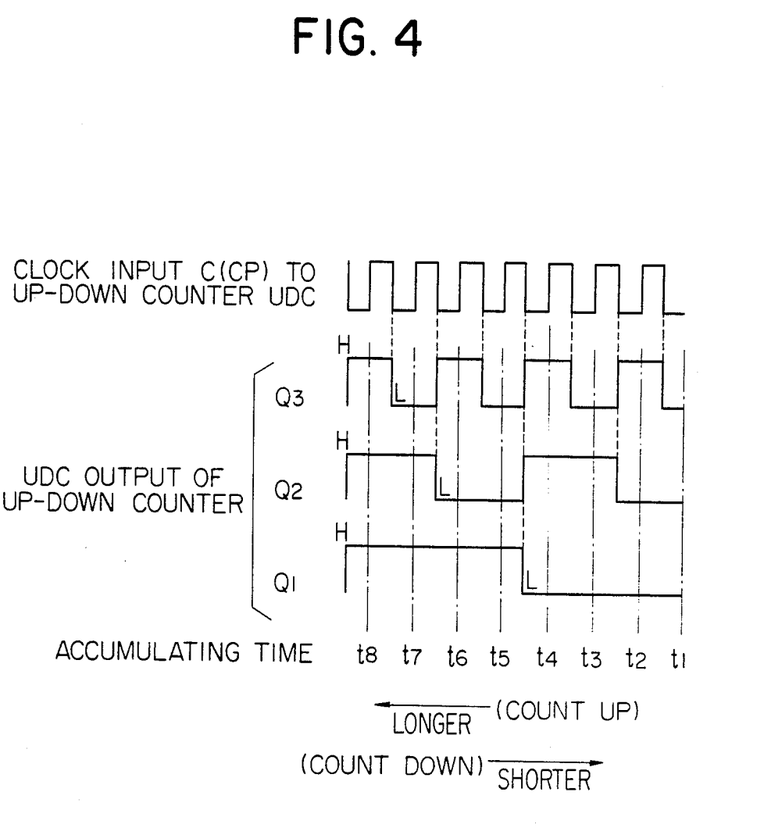
FIG. 4 is a timing chart showing the relation between the output of a 3-bit up-down counter shown in FIG. 3 and the signal integration time.

$AG_2$ designates an analog gate for taking out only the signals corresponding to the light-receiving elements $S_1$-$S_n$, of the output of the differential amplifier circuit. PD denotes a peak detecting circuit (which may also detect the average value) for detecting, for example, the peak value (hereinafter referred to as VP) of the signal obtained through the analog gate $AG_2$. PH designates a peak holding circuit for holding the peak value VP detected by the peak detecting circuit. $R_9$, $R_{10}$ and $R_{11}$ denote voltage dividing resistors for obtaining the voltages $V_{MAX}$ and $V_{MIN}$ corresponding to the upper limit and lower limit reference levels described in connection with FIG. 1. $CP_1$ designates a comparator which compares the held value VP of the peak holding circuit PH with the upper limit reference voltage $V_{MAX}$ and puts out a high level signal when $VP > V_{MAX}$ and puts out a low level signal when $VP \leq V_{MAX}$. $CP_2$ denotes a comparator which compares the held value VP with the lower limit reference voltage $V_{MIN}$ and puts out a high level signal when $VP < V_{MIN}$ and puts out a low level signal when $VP \geq V_{MIN}$. $IV_1$ designates an inverter for inverting the output of the comparator $CP_1$. The output of the inverter $IV_1$ is imparted to an up-down counter UDC(which is a binary up-down counter of 3-bit construction) as a signal for controlling the counting mode of this up-down counter UDC. The up-down counter UDC is set so as to assume an up count mode by the high of the output of the inverter $IV_1$ and to assume a down count mode by the low of the output of the inverter $IV_1$. $OR_1$ denotes an OR gate for taking the logical sum of the output of the comparator $CP_1$ and the output of the comparator $CP_2$. EX denotes an exclusive OR gate for taking the exclusive-or of the 3-bit outputs $Q_1$, $Q_2$, $Q_3$ of the up-down counter UDC and the output of the inverter $IV_1$. $AN_1$ designates an AND gate for taking the logical multiple of the output of the OR gate $OR_1$, the output of the exclusive OR gate EX and the counting pulse CP from a timing control circuit TCC to be described. The output of the AND gate $AN_1$ is imparted to the up-down counter UDC as the count clock of this up-down counter UDC. The exclusive OR gate EX is for preventing the resetting of the up-down counter UDC when the integration time has been set to the shortest time $t_1$ or the longest time $t_8$ and further the shift information toward the short time or the long time side has been put out from the comparator $CP_1$ or $CP_2$ and for fixing the integration time to the currently set shortest or longest integration time. The relations between the 3-bit outputs $Q_1$-$Q_3$ of the up-down counter UDC and the eight stages of integration time $t_1$-$t_8$ designated thereby are as shown in FIG. 4.

Figure 5:
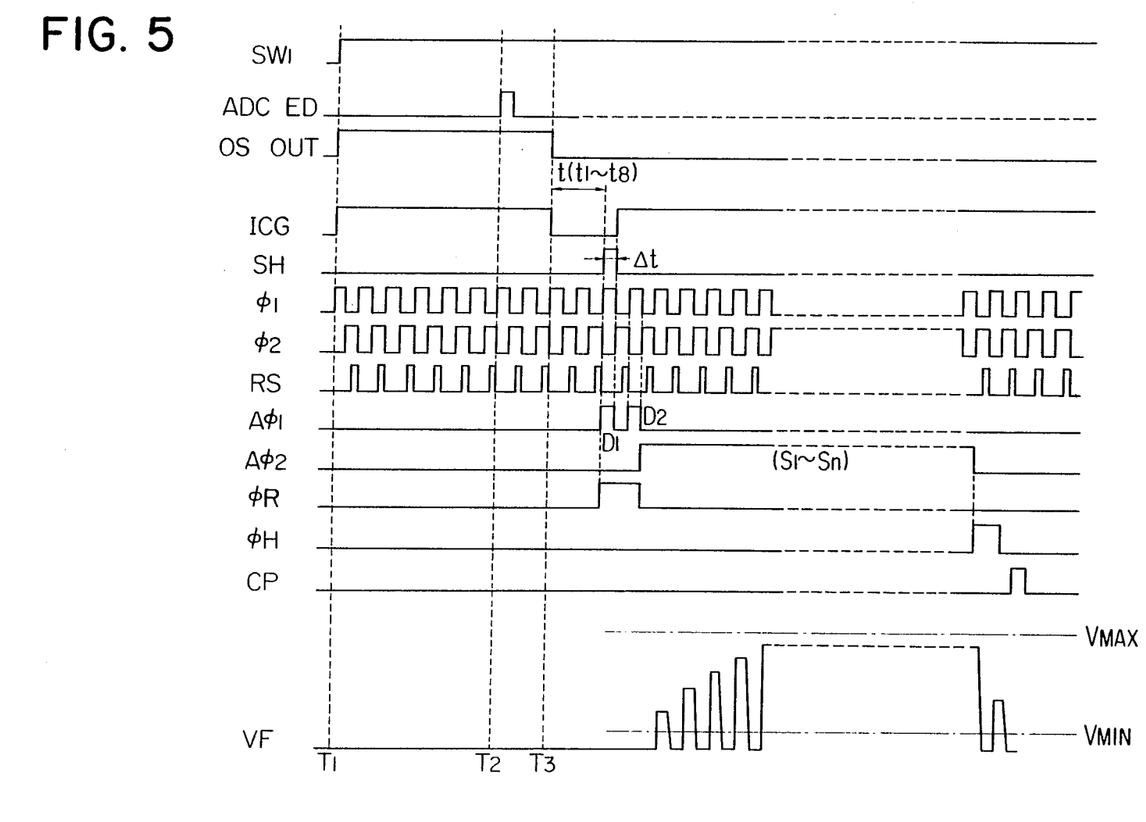
FIG. 5 is a timing chart showing various control signals produced by a timing control circuit shown in FIG. 3.

TCC designates a timing control circuit for generating various control pulses and control signals in accordance with the timing chart shown in FIG. 5. CP is the counting pulse of the up-down counter UDC generated once each time the signals of the image scanning sections $SD_1$-$SD_3$ are read out (that is, the integration time controlling pulse). $A\emptyset_1$ is a gate controlling signal for the analog gate $AG_1$ for taking out through the analog gate $AG_1$ the signals of the portions necessary for detection of dark current during each read-out, namely, the signals corresponding to the dummy elements $D_1$ and $D_2$. $A\emptyset_2$ is a gate controlling signal for the analog gate $AG_2$ for taking out through the analog gate $AG_1$ the signals corresponding to the light-receiving elements $S_1$-$S_n$, of the output of the differential amplifier circuit $OP_1$, during each read-out. $\emptyset_R$ is a peak resetting control signal for resetting the peak detecting circuit PD, for example, immediately after each read-out is initiated. $\emptyset_H$ is a peak holding control signal for causing the peak detection value VP before the peak detecting circuit PD is reset to be held by the peak holding circuit PH each time each read-out is terminated. SH is a gate controlling pulse (shift pulse) for the charge shift gates $FB_1$-$FB_m$ in the image scanning section $SD_3$. ICG is a gate controlling signal (integration clear signal) for the integration clear gates $FA_1$-$FA_m$. $\emptyset_1$ and $\emptyset_2$ are transfer clock pulses for the charge transfer analog shift registers $CA_1$-$CA_{2m}$ (that is, the analog shift registers $CA_1$-$CA_{2m}$ are of the two-phase driven type, and the shift pulse SH is synchronous with $\emptyset_1$). RS is a reset pulse for the charge-voltage converting circuit FET $FC_1$. The above-described signals 2CG, SH, $\emptyset_1$, $\emptyset_2$ and RS are also supplied to the other image scanning sections $SD_1$ and $SD_2$.

The timing control circuit TCC has the function of controlling the signal integration time (charge accumulating time) of the image scanning sections $SD_1$-$SD_3$ on the basis of the time information designated by the outputs $Q_1$-$Q_3$ of the up-down counter UDC, and specifically realizes the control of the integration time by controlling the period of time from the falling of the integration clear signal ICG to its low level indicated by t in FIG. 5 till the rising of the shift pulse SH between the eight stages $t_1$-$t_8$ in accordance with the conditions of the outputs $Q_1$-$Q_3$ of the up-down counter UDC. Thus, the actual integration time of the image scanning sections $SD_1$-$SD_3$ is "the image t+ the duration $\Delta t$ of the high level of the shift pulse SH". Incidentally, the image scanning sections $SD_1$-$SD_3$ is of the two-phase driven type as previously described, but the signal of each element thereof is put out in synchronism with $\emptyset_1$ and the outputting thereof is initiated in synchronism with the shift pulse SH.

Now, in accordance with the improvement of the present invention, a construction for initial setting of the integration time as will hereinafter be described is added to the above-described construction of the image scanning system. In FIG. 3, a metering photoelectric conversion element PE is connected between the input terminals of a high input impedance operational amplifier $MP_1$. $LD_1$ designates a logarithmic compression element for logarithmically compressing the photocurrent produced in the photoelectric conversion element PE correspondingly to the brightness of the object to be photographed, and $CS_1$ denotes a constant current source which, together with a resistor $R_{20}$, supplies a bias voltage to the non-inverting input terminal of the operational amplifier $MP_1$. $R_{21}$-$R_{23}$ designate operational resistors, $OP_5$ denotes an operational amplifier, $CP_5$ designates a comparator, and $Mg_1$ denotes an aperture controlling magnet. $VR_1$ designates a variable resistor in which information "Sv - Tv", i.e., the film speed information Sv minus the shutter time information Tv, and in the operational amplifier $OP_5$, this information and the object luminance information which is the output of the operational amplifier $MP_1$ are computed and aperture information is put out to the output of the operational amplifier $OP_5$. The aperture information is displayed by an aperture information displaying ammeter MT and ah aperture corresponding to the luminance of the object to be photographed is automatically set through a variable resistor $VR_2$ operatively associated with an aperture adjusting member, the comparator $CP_5$ and the magnet $Mg_1$. Vc applied to the non-inverting inputs H) of the operational amplifier $OP_5$ and the comparator $CP_5$ is a bias level setting reference voltage.

On the other hand, $VR_3$ designates a variable resistor operatively associated with a shutter time setting member. The variable resistor $VR_3$, together with a capacitor $C_5$, constitutes a timer circuit. $SW_{10}$ denotes a count switch adapted to be opened substantially simultaneously with the start of movement of the first curtain of the shutter ST (FIG. 2). When the voltage across the capacitor $C_5$ reaches a predetermined value, a Schmidt trigger circuit ST is inverted to deenergize a magnet $Mg_2$ for controlling the second curtain of the shutter ST, thus terminating the exposure. $SW_1$ denotes a main switch, and E designates a power source. ADC denotes an A/D converter for converting the output of the operational amplifier $MP_1$, for example, into a 3-bit digital data. OS designates a one-shot circuit. $AN_2$ denotes an AND gate for taking the logical multiply of the output pulse of the one-shot circuit OS and the A/D conversion termination pulse from the terminal ED of the A/D converter ADC. The output of the AND gate $AN_2$ is imparted to the preset enable terminal PE of the up-down counter UDC.

Now, in the above-described construction, when the main switch $SW_1$ of the camera is closed at time $T_1$(see FIG. 5), the exposure amount control circuit of the camera starts operating and the one-shot circuit OS generates a pulse which assumes high level during the time from time $T_1$ till time $T_3$. Also, the A/D converter ADC starts the A/D conversion of the output of the operational amplifier $MP_1$ which is the information corresponding to the luminance of the object to be photographed. When the A/D converter ADC terminates the A/D conversion of the object luminance information at time $T_2$, an A/D conversion termination pulse is generated from the terminal ED thereof and accordingly, by the output of the AND gate $AN_2$, the preset enable terminal PE of the integration time setting up-down counter UDC assumes high level, whereby the output of the A/D converter ADC is preset to the up-down counter UDC. For example, if the conditions of the output terminals $Q_1$, $Q_2$ and $Q_3$ of the A/D converter ADC are high level, low level and high level, respectively, the output terminals $Q_1$, $Q_2$ and $Q_3$ of the up-down counter UDC also assume similar conditions and accordingly, the first integration time becomes $t_6$ (see FIG. 4).

On the other hand, upon closing of the main switch $SW_1$, the timing control circuit TCC starts to put out transferring clock pulses $\emptyset_1$, $\emptyset_2$ and reset pulse RS to the image scanning sections $SD_1$-$SD_3$ at time $t_1$ and renders the integration clear signal ICG high and opens the integration clearing gates $FA_1$-$FA_m$, thereby inhibiting the accumulation of the produced charges in the dummy elements $D_1$, $D_2$ and the light-receiving elements $S_1$-$S_n$.

Thereafter, at time $T_3$, the output of the one-shot circuit OS is inverted to low level, whereupon in response to this signal, the integration clear signal ICG is rendered low as shown in FIG. 5 and the integration clearing gates $FA_1$-$FA_m$ are closed, whereby the accumulation of the produced charges in the elements $D_1$, $D_2$ and $S_1$-$S_n$ is initiated while, at the same time, the accumulating time designated by the outputs $Q_1$-$Q_3$ of the up-down counter UDC (in this case, the accumulating time is $t_6$) begins to be counted and, when this time counting is terminated, the shift pulse SH is put out. Accordingly, at this point of time, the charge shifting gates $FB_1$-$FB_m$ are opened, whereby the charges accumulated in the elements $D_1$, $D_2$ and $SD_1$-$SD_n$ while said time counting is being effected are introduced through the charge shifting gates $FB_1$-$FB_m$ into the corresponding bits of the charge transferring analog shift resisters $CA_1$-$CA_{2m}$, whereafter the charges are transferred through the analog shift resisters $CA_1$-$CA_{2m}$ to the charge-voltage converting circuit, where the charges are converted into a voltage and put out as voltage information. The timing control circuit TCC, after having put out the shift pulse SH, again renders the integration clear signal ICG high and opens the integration clearing gates $FA_1$-$FA_m$, thereby inhibiting the accumulation of the produced charges in the elements $D_1$, $D_2$ and $S_1$-$S_n$. Now, when the outputting of scanning signals from the image scanning sections $SD_1$-$SD_3$ is thus initiated, the timing control circuit TCC renders the gate controlling signal $A\emptyset_1$ to the analog gate $AG_1$ high at a timing whereat the signal corresponding to the dummy elements $D_1$ and $D_2$ is put out as shown in FIG. 5, and opens the analog gate $AG_1$ and thus, the signal corresponding to the dummy elements $D_1$ and $D_2$ is held as the dark current signal of the image scanning section $SD_3$ by the capacitor $C_1$, and the dark current signal thus held is imparted to one input of the differential amplifier circuit through the buffer amplifier BP. Thus, the differential amplifier circuit then receives at the other input thereof the signal corresponding to the light-receiving elements $S_1$-$S_n$, whereby it puts out said signal minus the dark current signal component, namely, the dark-current-compensated scanning signal VF. On the other hand, at this time, the timing control circuit renders the gate controlling signal $A\emptyset_2$ to the analog gate $AG_2$ high during the period of time in which the signal corresponding to the light-receiving elements $S_1$-$S_n$ is put out from the image scanning section $SD_3$ as shown in FIG. 5, thereby opening the analog gate $AG_2$ and accordingly, of the output of the differential amplifier circuit, the output corresponding to the light-receiving elements $S_1$-$S_n$ is imparted to the peak detecting circuit PD. The peak detecting circuit PD is already reset by the reset signal $\emptyset_R$ from the timing control circuit TCC as shown in FIG. 5 during the period of time in which, for example, the signal corresponding to the dummy elements $D_1$ and $D_2$, and is imparted the output of the differential amplifier circuit corresponding to the light-receiving elements $S_1$-$S_n$ through the analog gate $AG_2$, whereby it detects the peak value thereof. When the outputting of the signal corresponding to the light-receiving elements $S_1$-$S_n$ from the image scanning section $SD_3$ is terminated, the timing control circuit TCC renders the gate controlling signal $A\emptyset_2$ low as shown in FIG. 5 and closes the analog gate $AG_2$ to thereby terminate the peak value detection by the peak detecting circuit PD, whereafter it imparts a hold signal $\emptyset_H$ to the peak holding circuit PH to cause the same to hold the peak detection output VP of the peak detecting circuit PD at this point of time. When the peak value VP is held by the peak holding circuit PH, the comparators $CP_1$ and $CP_2$ compare the held peak value VP with the upper limit and lower limit reference voltages $V_{MAX}$ and $V_{MIN}$, and put out the result of the comparison as a high or low logic signal. Generally, good control of the integration time of the image sensing device disposed within the camera can be accomplished by the output of the metering photoelectric conversion element in the camera, but where the metering portion of the metering photoelectric conversion element is not the same as the light-receiving portion of the image sensing device, a scanning output of appropriate level may sometimes not be obtained from the image sensing device for the integration time controlled by the output of the metering photoelectric conversion element.

The present invention solves these problems and provides a method for obtaining a scanning output of appropriate level in a very short time. According to the present invention, the initial integration time is set in an integration time setting circuit by the output of an exposure amount controlling photoelectric conversion element disposed within the camera, and whether the level of a scanning signal put out under such initial integration time is within the range of a predetermined signal level is discriminated and when only (and when) the level of the scanning signal is not within the range of the predetermined signal level, a new setting of the integration time is effected through the integration time setting circuit so that the level of the scanning signal is within the range of the predetermined signal level, whereby a scanning output of appropriate level is obtained in a very short time.

Now, assuming, for example, that the peak hold value VP in $VP<V_{MIN}$, the output of the comparator $CP_1$ is low and the output of the comparator $CP_2$ is high and accordingly, the output of the inverter $IV_1$ is high, whereby the up-down counter UDC is set to the up count mode while, at the same time, the output of the OR gate $OR_1$ becomes high and at this time, the output of the exclusive OR gate EX also becomes high. Accordingly, after the holding of the peak detection output VP of the peak detecting circuit PD by the peak holding circuit PH is completed, a count pulse CP is put out to the up-down counter UDC from the timing control circuit TCC as shown in FIG. 5, whereupon the count pulse CP is imparted to the count input of the up-down counter UDC through the AND gate $AN_1$ and the up-down counter UDC effects one count up and accordingly, as shown in FIG. 4, the outputs $Q_1$-$Q_3$ thereof become high, high and low, respectively, whereby as shown in FIG. 4, the designated integration time of the solid state image sensing element SP is changed from the shortest time $t_6$ to the next time $t_7$. Thus, during the next cycle of scanning, the timing control circuit TCC controls the period of time t from the falling of the integration clear signal ICG to its low level till the rising of the shift pulse SH in accordance with the time t, whereby the integration time of the image scanning sections $SD_1$-$SD_3$ is prolonged from $t_6$ to $t_7$ and the level of the scanning output VF obtained through the differential amplifier circuit is caused to rise from this. This integration time changing operation is repeated until the condition that $V_{MIN} \leq VP \leq V_{MAX}$ is obtained and, when the condition that $V_{MIN} \leq VP \leq V_{MAX}$ is finally obtained, the outputs of the comparators $CP_1$ and $CP_2$ both become low, whereby the output of the OR gate $OR_1$ becomes low and the supply of the count pulse CP from the timing control circuit TCC to the up-down counter UDC is inhibited by the AND gate $AN_1$ and thus, at this point of time, the change of the integration time is stopped and the integration time is maintained at this proper time. Of course, if the condition that $VP < V_{MIN}$ again arises during the time the scanning is repeated under this proper integration time, the integration time will be changed to a longer time by the above-described operation. If, conversely, the condition that $VP > V_{MAX}$ arises, the output of the comparator $CP_1$ will become high and the output of the comparator $CP_2$ will become low and the output of the inverter $IV_1$ will become low, whereby the up-down counter UDC will be set to the down count mode and will effect one count down by the count pulse CP from the timing control circuit TCC, whereby the integration time will be changed to a shorter time. Thus, through such operation, the integration time of the image scanning sections $SD_1$-$SD_3$ is always controlled to a proper time, namely, such a time that the proper image signal level of $V_{MIN} \leq VP \leq V_{MAX}$ is obtained.

On the basis of the scanning outputs VF', VF" and VF thus obtained from the image scanning sections $SD_1$-$SD_3$, detection of the focus is carried out in a focus detecting circuit PCK and, when the picture-taking lens is automatically or manually set to the in-focus position, the output of the terminal ED of the focus detecting circuit PCK assumes high level and shutter release becomes possible. The focus detecting circuit PCK thus using the scanning signals from the three image scanning sections $SD_1$-$SD_3$ to effect detection of the focus is fully disclosed in U.S. patent application Ser. No. 310,483 entitled "Focus Detecting System" filed on Oct. 9, 1981, assigned to the assignee hereof, abandoned in favor of continuation application U.S. Ser. No. 572,972, filed Jan. 23, 1984, abandoned in favor of continuation application U.S. Ser. No. 627,488, filed July 5, 1984, and U.S. patent applications Ser. No. 313,579, entitled "Focus Detecting System", which was filed Oct. 21, 1981 and issued as U.S. Pat. No. 4,459,002 on July 10, 1984, U.S. Ser. No. 313,582 "Camera System", filed Oct. 21, 1981, abandoned in favor of continuation application U.S. Ser. No. 631,008, U.S. Ser. No. 313,583 "Focus Detecting System", which was filed Oct. 21, 1981 and issued as U.S. Pat. No. 4,411,504 on Oct. 25, 1983, U.S. Ser. No. 313,584 "Focus Detecting System", which was filed Oct. 21, 1981, abandoned in favor of continuation application U.S. Ser. No. 577,329, which was filed Feb. 8, 1984 and issued as U.S. Pat. No. 4,475,800 on Oct. 9, 1984, and U.S. Ser. No. 313,599 "Signal Processing System", which was filed Oct. 21, 1981 and issued as U.S. Pat. No. 4,437,743 on Mar. 10, 1984, all of which are assigned to the assignee of the present application.

When a shutter release button (not shown) is depressed in this condition, the switch $SW_2$ is closed and a transistor $TR_1$ is turned on by an inverter $IV_2$ and an AND gate $AN_3$, so that the charge stored in a capacitor $C_6$ is discharged through a resistor 24 and a magnet $Mg_3$ is energized to start the release of the shutter ST.

According to the present invention, a scanning output of appropriate level can be obtained in a very short time and therefore, where the image scanning system of the present invention is applied, for example, to the focus detecting portion of an automatic focus camera, there can be obtained a great advantage that focusing is accomplished in a short time to enable photography.

What I claim is:

1. A radiation sensing system comprising:
(A) signal integration type radiation sensing means responsive to radiation and arranged to produce an electrical output indicative of the integration of the received radiation during a signal integration time;
(B) radiation measuring means arranged to measure radiation substantially equivalent to the radiation which said sensing means receives, said measuring means producing an electrical output indicative of the intensity of the received radiation; and
(C) signal integration time control means for controlling the signal integration time of said sensing means on the basis of the outputs of said measuring means and said sensing means,
wherein said signal integration time control means is arranged to determine an initial signal integration time of said sensing means on the basis of the output of said measuring means.

2. The system according to claim 1, wherein said signal integration time control means is arranged to select said initial signal integration time from among a plurality of different preset signal integration times on the basis of the output of said measuring means.

3. The system according to claim 2, wherein said signal integration time control means is arranged to control the signal integration time of the sensing means among said preset signal integration times on the basis of the output of said sensing means with said initial signal integration time determined on the basis of the output of said measuring means as the starting point.

4. The system according to claim 1, wherein said signal integration time control means is arranged to control the signal integration time of the sensing means on the basis of the output of said sensing means with said initial signal integration time determined on the basis of the output of said measuring means as the starting point.

5. The system according to claim 1, 2, 3 or 4, wherein said signal integration time control means includes:
means for discriminating the level of the output of said sensing means, said discrimination means producing an output indicative of the result of said discrimination; and
means for determining the signal integration time of said sensing means on the basis of the outputs of said measuring means and said discrimination means, said determination means first determining said initial signal integration time on the basis of the output of the measuring means and thereafter varying the signal integration time on the basis of the output of the discrimination means with said determined initial signal integration time as the starting point.

6. The system according to claim 5, wherein said discrimination means is arranged to produce a logic output as said discrimination result;

and said determination means includes:

a conversion circuit for receiving and converting the output of said measuring means into digital data;

a time indication circuit responsive to said digital data formed by said conversion circuit and to said logic output of said discrimination means to indicate the signal integration time of said sensing means; and a time control circuit for controlling the signal integration time of the sensing means in accordance with an indication output of said indication circuit.

7. The system according to claim 6, wherein said time indication circuit includes:

a presettable up-down counter for providing digital data indicative of the signal integration time; and a counter controller for controlling said counter, said controller first presetting in the counter the digital data formed by said conversion circuit and thereafter varying the count value of the counter on the basis of the logic output of said discrimination means.

8. The system according to claim 7, wherein said discrimination means includes:

a comparison circuit for comparing the level of the output of said sensing means with a predetermined range of levels, said comparison circuit producing said logic output as a result of said comparison.

9. The system according to claim 8, wherein said discrimination means further includes:

a peak detection circuit for detecting a peak level of the output of said sensing means;

said comparison circuit is arranged to compare the peak level detected by said detection circuit with said range of levels.

10. The system according to claim 6, wherein said discrimination means includes:

a comparison circuit for comparing the level of the output of said sensing means with a predetermined range of levels, said comparison circuit producing said logic output as a result of said comparison.

11. The system according to claim 10, wherein said discrimination means further includes:

a peak detection circuit for detecting a peak level of the output of said sensing means;

said comparison circuit is arranged to compare the peak level detected by said detection circuit with said range of levels.

12. The system according to claim 5, wherein said discrimination means includes:

a comparison circuit for comparing the level of the output of said sensing means with a predetermined range of levels, said comprison circuit producing said output as a result of said comparison.

13. The system according to claim 12, wherein said discrimination means further includes:

a peak detection circuit for detecting a peak level of the output of said sensing means;

said comprison circuit is arranged to compare the peak level detected by said detection circuit with said range of levels.

14. An image scanning system comprising:

(A) image sensing means having an array of a plurality of signal integration type sensing elements, each of which produces an electrical signal corresponding to an integration of a received portion of an image light during a signal integration time, said sensing means providing, as an output thereof, the signals produced by said elements;

(B) measuring means for measuring the intensity of a light substantially equivalent to at least a portion of said image light, said measuring means producing an output indicative of the intensity of said light;

(C) indication means for indicating the signal integration time of the sensing elements in said sensing means;

(D) first control means for controlling the signal integration time of said sensing elements in said sensing means in accordance with the time indicated by said indication means; and (E) second control means for controlling said indication means, said second control means controlling to cause the indication means to first indicate an initial integration time on the basis of the output of said measuring means and thereafter change indication of the integration time on the basis of the output of said sensing means.

15. The system according to claim 14, wherein said indication means is arranged to select said initial signal integration time from among a plurality of different preset signal integration times on the basis of the output of said measuring means under the control of said second control means.

16. The system according to claim 15, wherein said indication means is arranged to change the signal integration time of said sensing means, from one to another of said preset signal integration times, on the basis of the output of said sensing means under the control of said second control means.

17. The system according to claim 14, 15 or 16, wherein said indication means includes:

means for discriminating the level of the output of said sensing means, said discrimination means producing an output indicative of the result of said discrimination; and means for determining the signal integration time of said sensing means on the basis of the outputs of said measuring means and said discrimination means, said determination means first determining said initial signal integration time on the basis of the output of said measuring means and thereafter varying the signal integration time on the basis of the output of said discrimination means under the control of said second control means.

18. The system according to claim 17, wherein said discrimination means is arranged to produce a logic output as said discrimination result and wherein said determination means includes:

a conversion circuit for receiving and converting the output of said measuring means into digital data; and a time indication circuit responsive to said digital data formed by said conversion circuit and to said logic output of said discrimination means to indicate the signal integration time of said sensing means;

said first control means controlling the signal integration time of said sensing means in accordance with an indication output of said indication circuit.

19. The system according to claim 17, wherein said time indication circuit includes:

a presettable up-down counter for providing digital data indicative of the signal integration time; and a counter controller for controlling said counter, said controller first presetting in said counter said digital data formed by said conversion circuit and thereafter varying the count value of said counter on the basis of the logic output of said discrimination means.

20. The system according to claim 19, wherein said discrimination means includes:

a comparison circuit for comparing the level of the output of said sensing means with a predetermined range of levels, said comparison circuit producing said logic output as a result of said comparison.

21. The system according to claim 20, wherein said discrimination means further includes a peak detection circuit for detecting a peak level of the output of said sensing means; and wherein said comparison circuit is arranged to compare the peak level detected by said detection circuit with said range of levels.

22. An image scanning system comprising:
(A) image sensing means having an array of a plurality of signal integration type sensing elements, each of which produces and stores an amount of an electrical signal corresponding to an integration amount of a received portion of an image light for each image scanning, said sensing means providing, as an output thereof, the signals produced by said elements;
(B) measuring means for measuring the intensity of a light substantially equivalent to at least a portion of said image light, said measuring means producing an output indicative of the intensity of said light;
(C) first control means for controlling the amount of the electrical signal to be produced and stored in each of said sensing elements in said sensing means for each image scanning; and
(D) second control means for controlling said first control means, said second control means causing the first control means to first control said signal amount on the basis of the output of said measuring means and thereafter control said signal amount on the basis of the output of said sensing means.

23. The system according to claim 22, wherein said first control means includes:

a conversion circuit for receiving and converting the output of said measuring means into first digital data;

a comparison circuit for comparing the level of the output of said sensing means with a predetermined range of levels, said comparison circuit producing second digital data as a result of said comparison; and a control circuit for controlling said signal amount to be produced and stored in each of the sensing elements in said sensing means for each image scanning on the basis of said first and second digital formed by said conversion circuit and said comparison circuit;

said second control means causing said control circuit to first control the signal amount on the basis of said first digital data and thereafter control the signal amount on the basis of said second digital data.

* * * * *

UNITED STATES PATENT AND TRADEMARK OFFICE
CERTIFICATE OF CORRECTION

PATENT NO. : 4,523,101

DATED : June 11, 1985

INVENTOR(S) : TOKUICHI TSUNEKAWA

It is certified that error appears in the above-identified patent and that said Letters Patent is hereby corrected as shown below:

Column 2: line 53, change "pf" to --of--.

Column 3: line 39, after "surface" insert --of--;
          line 51, change "conceptionally" to --conceptually--.

Column 6: line 27, change "ah" to --an--;
          line 32, delete "H)";
          line 50, change "multiply" to --product--.

Column 11: line 38, after the semicolon, insert --and wherein--
           line 51, after the semicolon, insert --and wherein--
           line 64, after the semicolon, insert --and wherein--

Column 12: line 21, change "the" to --said--;
           line 23, change "change indication" to --change the indication--.

Signed and Sealed this

Fourth Day of March 1986

[SEAL]

Attest:

DONALD J. QUIGG

Attesting Officer

Commissioner of Patents and Trademarks